June 9, 1942.                J. L. FINCH                2,285,506
              TEMPERATURE CONTROL FOR RECTIFIER TUBES
                    Filed May 24, 1940           3 Sheets-Sheet 3

INVENTOR.
JAMES L. FINCH
BY
ATTORNEY.

Patented June 9, 1942

2,285,506

UNITED STATES PATENT OFFICE 2,285,506

TEMPERATURE CONTROL FOR RECTIFIER TUBES

James L. Finch, Patchogue, N. Y., assignor to Radio Corporation of America, a corporation of Delaware Application May 24, 1940, Serial No. 336,969

10 Claims. (Cl. 250—27.5)

This invention relates to new and useful temperature control devices for controlling the temperature of a rectifier tube compartment of a radio transmitter.

An object of this invention is to improve the efficiency of the transmitter by maintaining a desired operating temperature for the rectifier tubes at all times irrespective of the changes of the outside atmosphere.

Another object of this invention is to provide automatic means for interchanging the air within the tube compartment by means of a thermostat device for opening and closing a plurality of doors.

A feature of this invention is the novel linking of the doors with the thermostat device and so arranging a fluid circulating member to apply a blast of either cooled or heated air on the surface of the rectifier tubes to maintain a desired operating temperature.

This invention involves means for circulating air through the rectifier tube compartment in which are mounted the rectifier tubes of the mercury vapor type with means for interchanging the air with air outside of the compartment as required for cooling or heating the compartment. This is carried out by means of an air circulating fan and thermostatically operated doors.

Although temperature control devices for rectifier tubes are old in the art, in such devices excessive temperature differences were required for changing between minimum and maximum amounts. In other forms known in the prior art, expensive and heavy motor-driven devices were generally required for operating the doors of the rectifier tube compartment.

This invention will best be understood by referring to the accompanying drawings, in which.

Figure 1:
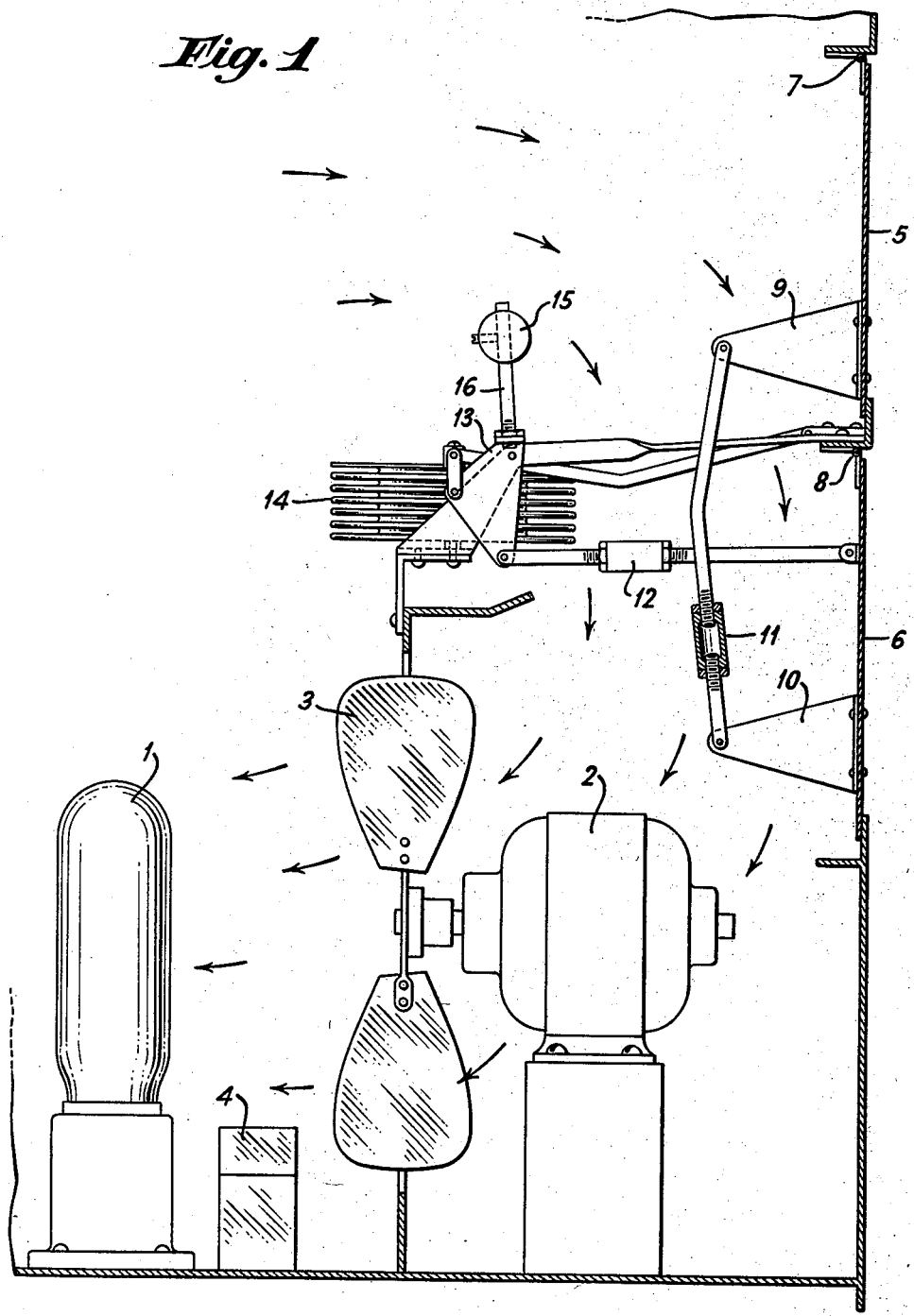
Fig. 1 is a sectional view of the rectifier compartment of a radio transmitter.
Figure 2:
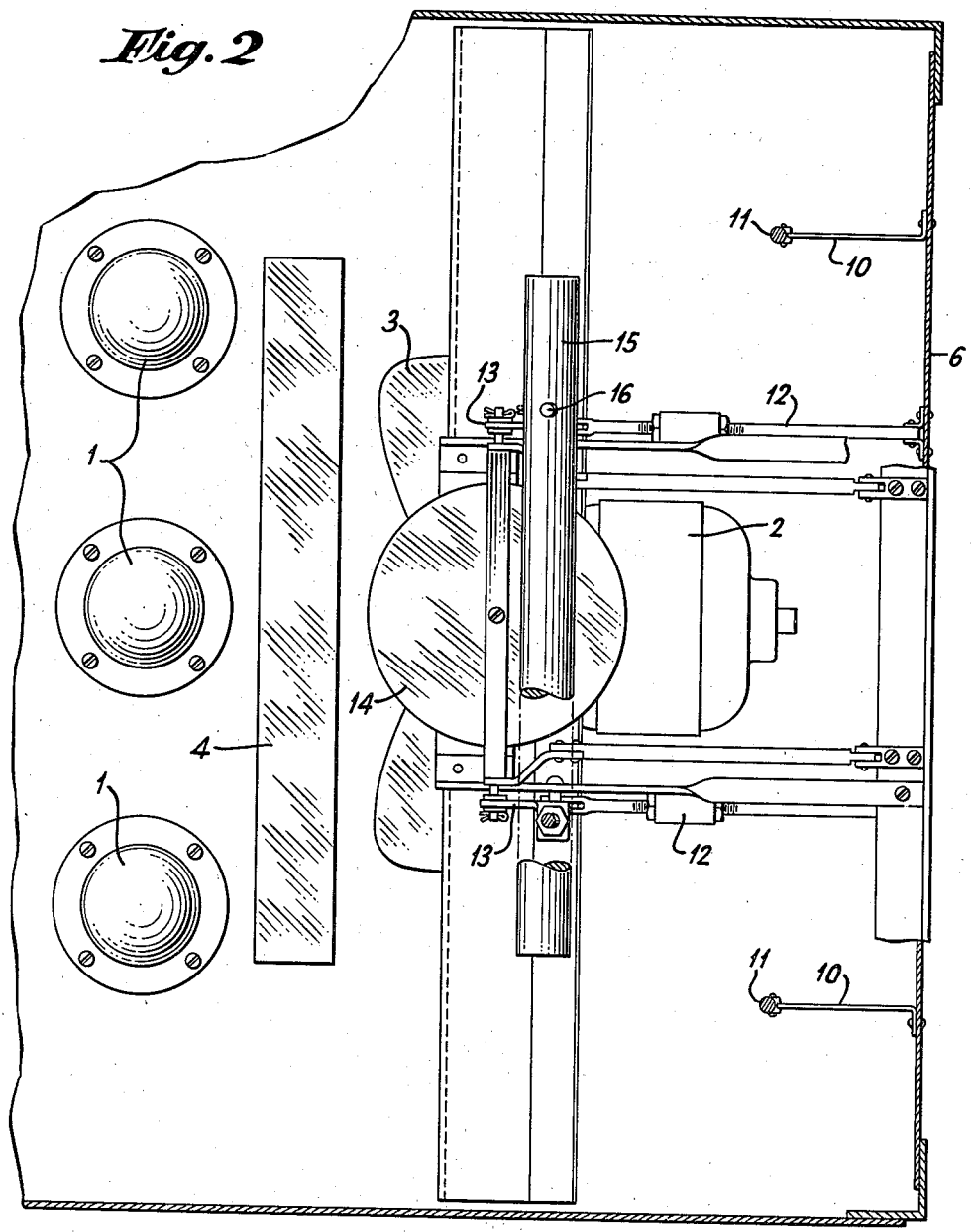
Fig. 2 is a plan view of Fig. 1.
Figure 3:
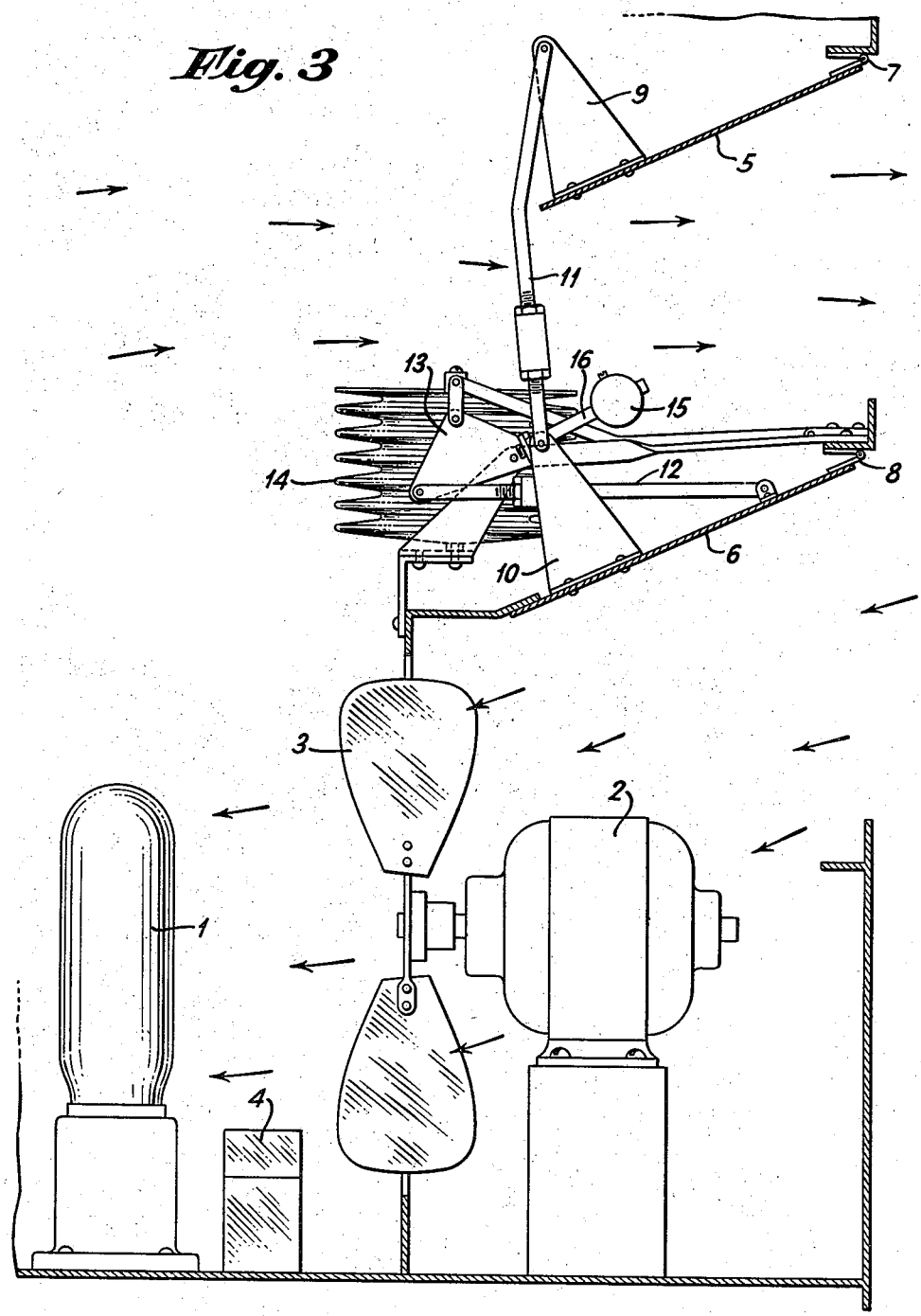
Fig. 3 is a sectional view similar to that of Fig. 1, except that the doors are shown open.

Referring now in detail to the drawings, the rectifier tubes 1 are shown placed to the left of the compartment. A fluid circulating device 2, which may be either that of a motor-driven fan or blower, is centrally located within the compartment and arranged to apply a blast of air on the mercury vapor rectifier tubes. The motor-driven device 2 is preferably running continuously whenever the rectifier tubes are in operation for the continuous circulation of the air, although it may be arranged to run intermittently by a switch arrangement coupled to the thermostat. The air blast from device 2 leaves the fan blades 3 in the direction indicated by the arrows and passes any suitable cooling or heater device 4 which may be required to provide the desired operating temperature to the tubes and then past the rectifier tubes and returns along the top of the rectifier compartment and then down to the rear portion of the motor-driven fluid circulating device. When the temperature is below the value desired for proper operation of the transmitter, the two doors marked "5" and "6" are closed and the air circulates entirely inside the compartment, maintaining it at an even temperature throughout. The doors 5 and 6 are hinged at the top edge of the compartment by hinges 7 and 8 and are linked together by means of arms 9 and 10, which arms are coupled by means of an adjustable linkage 11, so that when one door is moved, the other one is caused to move simultaneously by a corresponding amount. The lower door 6 is connected by a pair of adjustable linking members 12 through the medium of bellcranks 13 to a thermostat device 14, as indicated, or any suitable temperature responsive device. This temperature responsive device is of the liquid bellows type and has within it a small quantity of liquid which has a boiling point near the temperature at which the rectifier tubes are desired to be held. For example, in some installations, ethyl ether is a suitable liquid for the thermostat. The thermostat 14 is preferably placed directly in the air stream indicated by the arrows so that it readily assumes the temperature of the air in the compartment. When the temperature rises, the liquid in the thermostat 14 boils and the thermostat expands, thus increasing the height of the thermostat, as shown in Fig. 3, and in turn opens the doors. When the doors are part way open, a portion of the air through the fan blades 3 goes out through the upper door and the new air from the outside comes in to replace it through the lower door. When the doors are in their extreme open position, as indicated by Fig. 3, all the circulating air goes out and is replaced by new air.

In the prior art, air bellows type thermostats were used for opening doors, which often had to overcome the weight of the doors by building up an appreciable vapor pressure within the thermostat. In some cases, where the thermostat was made of a metal bellows, this vapor pressure also had to overcome the spring effect of the metal of the bellows. In my invention, I counterweight the doors by means of counterweight 15, the weight of which is chosen to be of such value and is so adjustably placed on a rod 16 and coupled to the linkage system that it just overbalances the weight of the doors and, in addition, very nearly compensates for any spring that might be in the bellows. Thus, a very low temperature change will produce sufficient vapor pressure to open the doors to their full extent.

Although only one modification of this invention is shown, it should not be limited precisely thereto.

What is claimed is:

1. A rectifier temperature control system comprising a plurality of rectifier tubes, a compartment for said rectifier tubes, a fluid circulating device located within said compartment for circulating the air within said compartment, a plurality of doors secured to said compartment, a thermostat device within said compartment, and a linked system located within said casing and coupled to said thermostat device and said doors to control the temperature of said compartment and to open or close said doors upon a change of temperature.

2. A rectifier fluid circulating and control system comprising a plurality of rectifier tubes, a compartment for said rectifier tubes, a fluid circulating device located within said compartment for circulating the air within said compartment, a plurality of doors secured to said compartment, a temperature responsive device within said compartment, and a linkage system located within said casing and coupled to said temperature responsive device and said doors to control the temperature of said compartment and to open or close said doors upon a change of temperature.

3. A rectifier fluid circulating and control system comprising a compartment for enclosing a plurality of rectifier tubes, said compartment having a plurality of openings therein, a plurality of doors hinged at the upper portion of said openings, a thermostat device within said compartment, a rotatable fluid circulating device within said compartment, linkage means located within said compartment and coupled to said thermostat, said fluid circulating device and said doors for simultaneously operating them upon a change of temperature.

4. A rectifier fluid circulating and control system comprising a compartment for enclosing a plurality of rectifier tubes, said compartment having a plurality of openings therein, a plurality of doors located one above the other hinged at the upper portion of said openings, a thermostat device within said compartment, a rotatable fluid circulating device within said compartment, linkage means coupled to said thermostat device and said doors for simultaneously operating them upon a change of temperature.

5. A rectifier fluid circulating and control system comprising a compartment for enclosing a plurality of rectifier tubes, said compartment having a plurality of openings therein, a plurality of doors hinged at the upper portion of said openings, a thermostat device within said compartment, a counterweight coupled to said doors, a rotatable cooling device within said compartment, and linkage means coupled to said rotatable device and said doors for simultaneously operating them upon a change of temperature.

6. A temperature control system comprising a compartment for enclosing a plurality of electron discharge tubes, a plurality of openings in said compartment, a plurality of doors hinged to said compartment, a thermostat device located within said compartment, a linkage system coupled between said thermostat device and said doors for simultaneously opening and closing them by the movement of said thermostat device upon a change of temperature for controlling the temperature within said compartment.

7. A rectifier temperature control system for a radio transmitter comprising a compartment for enclosing a plurality of thermionic devices, means for maintaining a desired temperature on said thermionic devices including a rotatable member for supplying a blast of air to said thermionic devices, said compartment having a plurality of openings therein, a plurality of doors secured to said openings, a liquid expansion type thermostat located adjacent said thermionic devices and in the stream of said cooling air, and a linkage system coupled between said thermostat and said doors to simultaneously open or close them upon a change of temperature.

8. A rectifier temperature control system for a radio transmitter comprising a compartment for enclosing a plurality of thermionic devices, means for maintaining a desired temperature on said thermionic devices including a rotatable member for supplying a blast of air to said thermionic devices, said compartment having a plurality of openings therein, a plurality of doors secured to said openings, a liquid expansion type thermostat located adjacent said thermionic devices and in the stream of said cooling air, a linkage system coupled between said thermostat and said doors to simultaneously open or close them upon a change of temperature, and a counter-weight coupled to said linkage system to balance said doors.

9. A rectifier temperature control system for a radio transmitter comprising a compartment for enclosing a plurality of thermionic devices, means for maintaining a desired temperature on said thermionic devices including a rotatable member for supplying a blast of air to said thermionic devices, said compartment having a plurality of openings therein, a plurality of doors secured to said openings, a liquid expansion type thermostat located adjacent said thermionic devices and in the stream of said cooling air, and a pair of linkage members symmetrically arranged with respect to said thermostat and coupled between said thermostat and said doors to simultaneously open or close them upon a change of temperature.

10. A rectifier temperature control system for a radio transmitter comprising a compartment for enclosing a plurality of thermionic devices, means for maintaining a desired temperature on said thermionic devices including a rotatable member for supplying a blast of air to said thermionic devices said compartment having a plurality of openings therein, a plurality of doors secured to said openings, a liquid expansion type thermostat located adjacent said thermionic devices and in the stream of said cooling air, a linkage system coupled between said thermostat and said doors to simultaneously open or close them upon a change of temperature, and a counter-weight having adjustable means coupled to said linkage system to balance said doors.

JAMES L. FINCH.